July 8, 1947.  C. K. GIERINGER  2,423,594
RESONANCE INDICATING AND CONTROLLING DEVICE
Filed July 23, 1942   2 Sheets-Sheet 1
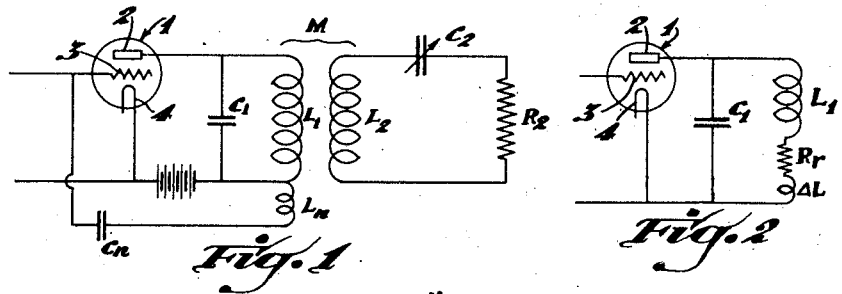
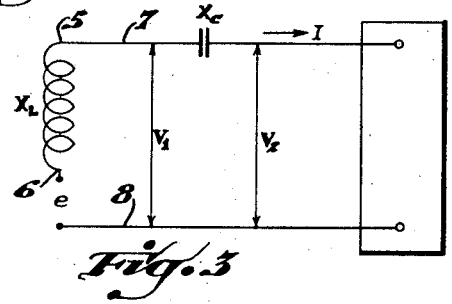
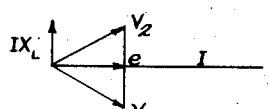 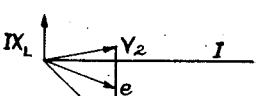 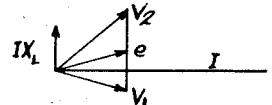
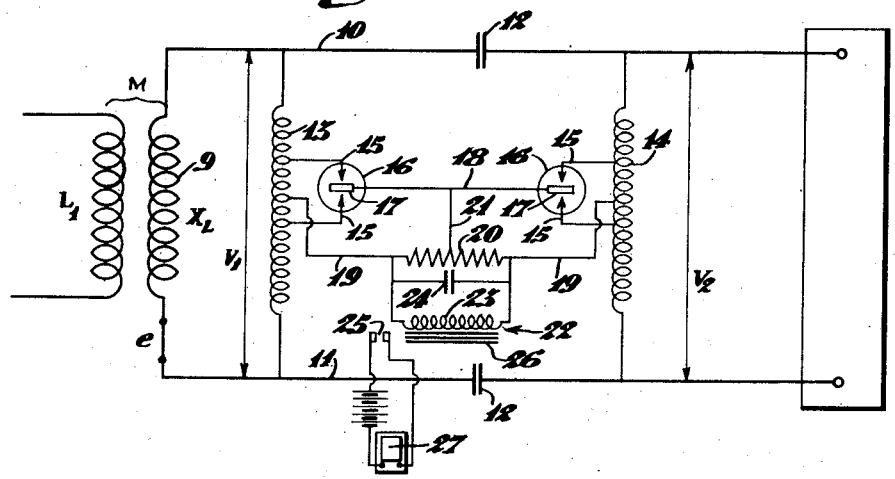
INVENTOR.
Carl K. Gieringer
BY
Wood, Arey, Herron & Evans
ATTORNEYS Patented July 8, 1947

2,423,594

UNITED STATES PATENT OFFICE 2,423,594

RESONANCE INDICATING AND CONTROLLING DEVICE

Carl K. Gieringer, Cincinnati, Ohio, assignor to The Liebel-Flarsheim Company, Cincinnati, Ohio, a corporation of Ohio Application July 23, 1942, Serial No. 452,073

6 Claims. (Cl. 250—27)

This invention relates to protective and signalling devices for oscillating circuits which are constructed and arranged to be actuated when phase conditions in the secondary or the output portion of the circuit vary from some predetermined value which it is desired to maintain. More particularly such devices are employed either for the purpose of preventing overloading of the electronic tubes, such as may occur in amplifiers when variations in the load cause detuning effects, or for the purpose of limiting deviations in the frequency as caused by variations in the load of self-excited oscillators.

It is requisite that the plate circuit of a master controlled amplifier be exactly in tune with the frequency being amplified for safe and efficient operation of the machine. While load conditions are relatively constant in transmission circuits the load varies over wide ranges when such devices are used for diathermy treatments or for industrial purposes. For example, in diathermy, the patient may move, in fact frequently does, during the course of a treatment and the load will vary commensurately. This change is manifested not only as a change in the reflected resistance of the circuit but as a change in the reflected inductance as well, that is, the inductance reflected upon the primary circuit by the load. While the coupling of greater or less resistance on the circuit has no effect on resonance conditions, the coupling of an additional inductance in the circuit exerts a detuning effect which, in turn, causes an increase in the current flowing in the plate circuit; but this increase in plate current causes no increase in the output from the machine. It is obvious, then, that if the tubes are loaded to capacity and a variation in the load causes even small detuning from the resonant condition, the increase in the plate current may and frequently does overload the tube and thereby damage it. Since the tubes are expensive it is highly desirable that this danger be avoided.

On the other hand, the present invention, as applied to self-excited oscillators, is employed for preventing the frequency from deviating beyond a given value. In a self-excited oscillator variations in the load tend to cause detuning effects which manifest themselves as deviations in the frequency as well as sometimes causing variations in plate current. In this respect the utilization of the present invention for the measurement of the phase between the current and the voltage in the secondary circuit furnishes a guide or pilot capable of causing a signalling effect to be produced whereupon the operator is warned to make adjustments necessary for the restoration of the predetermined frequency. In the alternative a control is exerted upon mechanism for automatically tuning the circuit to critical conditions.

I have determined briefly that the phase relationship between the current and the voltage of a secondary circuit may be measured by providing capacitive reactance in the secondary circuit which bears a predetermined relation to inductive reactance therein, and by comparing the total scalar voltage across the inductive reactance and the derived voltage of the secondary circuit on the one hand, with the total scalar voltage across the inductive and capacitive reactances and the derived voltage of the secondary circuit, on the other hand.

At resonance, or at some other given phase condition, the total scalar voltages in a circuit of this type will be either equal to one another or will be a predetermined relationship to one another, as governed by the relationship between the inductive and capacitive reactances. When the capacitive reactance provided in the secondary circuit is equal to twice the inductive reactance then, at resonance, the total scalar voltage across the inductive reactance and derived voltage will be exactly equal to the total scalar voltage across the inductive and capacitive reactances and the derived voltage. Conversely, under detuning conditions the scalar voltages, as just defined, are unequal and, more specifically, the difference between the scalar voltages is a measure of the phase condition.

In the preferred embodiment of the invention these scalar voltages are impressed in common upon a control circuit in such manner that their effects electrically tend to buck one another. At resonance the scalar voltages are equal and their effects are neutralized. When the derived voltage and current are out of phase, the voltage either lagging or leading the current, one of the scalar voltages is greater than the other and a current flows in the control circuit. This control current is exerted on a signalling device to designate detuning, on a switch through which the machine is disconnected or the power reduced so as to prevent damage to the tubes before the detuning effect can be corrected, or on an automatic controller by means of which the tuning of the circuit may be adjusted to the point where resonation is restored.

While the employment of capacitive reactance equal to two times the inductive reactance has been described in the illustration just referred to, a capacitive reactance may be greater or less than twice the inductive reactance in which event control currents of predetermined magnitude will flow in the control circuit when resonance exists or when another predetermined phase condition prevails. These may be compensated if desirable for special purposes.

The invention is disclosed in more detail in the explanatory diagrams and circuits shown in the drawings, in which Figure 1 diagrammatically illustrates a typical amplifier circuit.

Figure 2 is a diagrammatic illustration of the equivalent electrical circuit of Figure 1.

Figure 3 is a diagrammatic illustration of the electrical components of a secondary circuit.

Figures 4, 5, and 6 are vector voltage diagrams showing the phase relationship between the current and the voltage, Figure 4 showing the relations in which the voltage is in phase with the current, Figure 5 showing the relations in which the voltage lags the current, and Figure 6 showing the relations in which the voltage leads the current.

Figure 7 is a circuit diagram showing one embodiment of the present invention.

Figure 8:
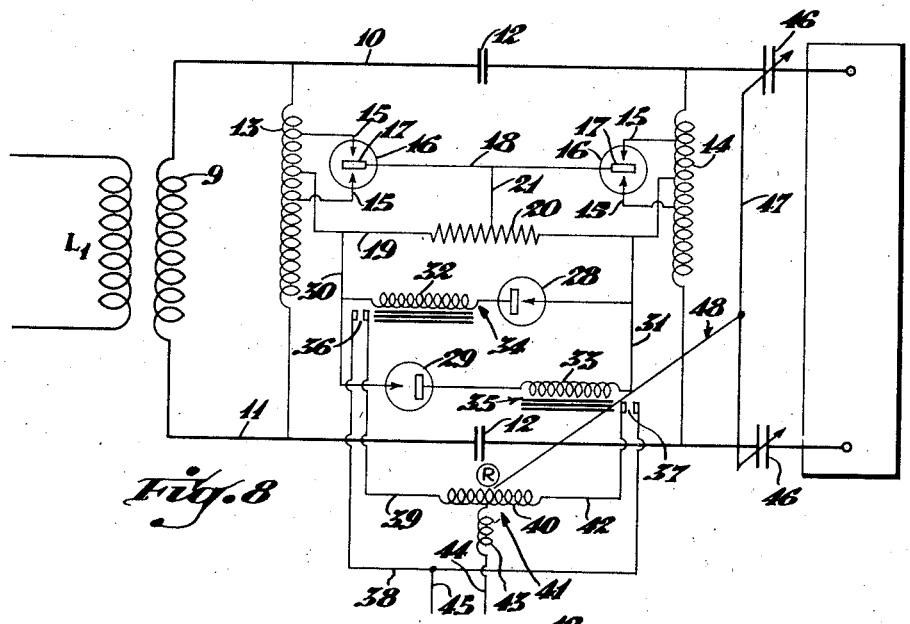

Figure 8 is a circuit diagram showing another embodiment of the invention.

Figure 9:
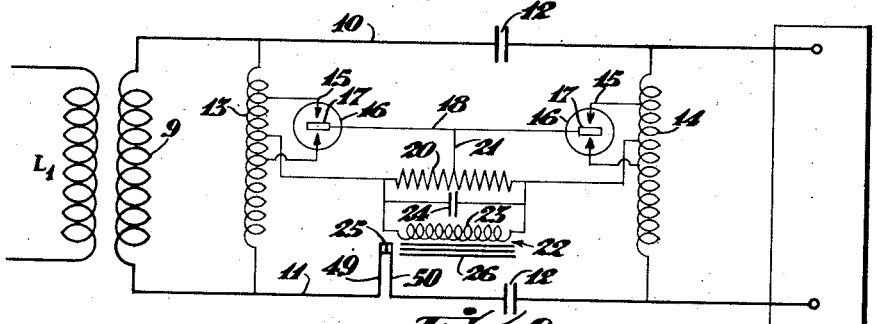

Figure 9 is a further circuit diagram showing a third embodiment of the invention.

Figure 10:
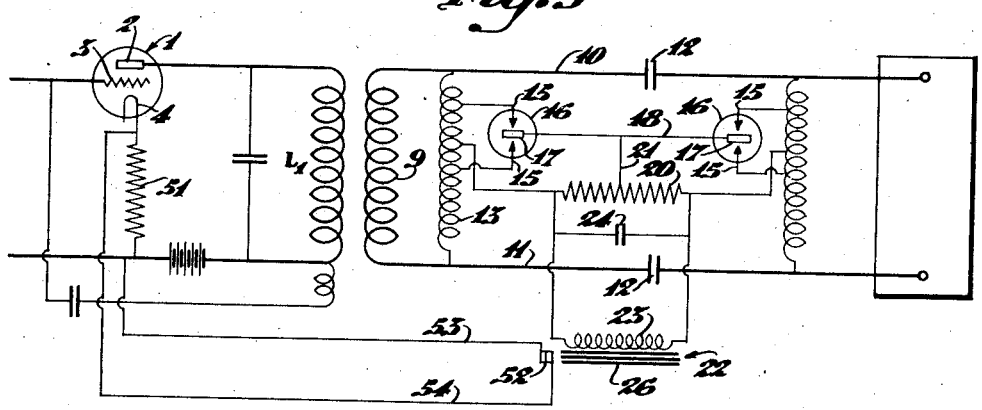

Figure 10 is a circuit diagram of a further modification of the invention in which the cathode bias is controlled.

The typical circuit of an amplifier is shown for the purpose of illustrating the premises of the invention in Figure 1. The primary circuit of the generator includes condenser $C_1$, and an inductance $L_1$, which are in resonance, connected in the usual manner to an amplifier tube 1 having plate, grid and filament elements 2, 3, and 4 respectively, with the additional inductance $L_n$ and the capacitance $C_n$ constituting a neutralizing circuit interconnected between the grid and plate circuits. The secondary portion of the circuit of the amplifier comprises a tuning condenser $C_2$, and the inductance $L_2$, e. g., coupling coil, with the inductance $L_2$ of the secondary circuit coupled to the inductance $L$, through the mutual inductance $M$. $R_2$ designates the resistance in the secondary circuit which corresponds to the load resistance.

The effect caused by the coupling of a load upon the secondary circuit of Figure 1 is shown in the equivalent electrical circuit, Figure 2, in which $R_r$ designates the reflected resistance caused by the coupling of the load, while $\Delta L$ designates the reflected inductance. The reflected resistance $R_r$ is a measure of the power transferred to the secondary circuit and has no influence on the tuning. However, the reflected inductance $\Delta L$ is dependent considerably upon the total reactance $X_2$ of the secondary circuit and tends to cause detuning. The exact value of $\Delta L$ and its relationship to the total reactance $X_2$ of the secondary circuit are illustrated as follows:

$$R_R = \frac{W^2 M^2 R_2}{R_2^2 + X_2^2}$$

and $$\Delta L = \frac{-WM^2 X_2}{R_2^2 + X_2^2}$$

In these expressions $R_R$ is the reflected resistance, $W$ is $2\pi$ times the frequency, $M$ is the mutual coupling, $R_2$ is the resistance of the secondary circuit, and $X_2$ is the reactance of the secondary circuit.

As previously explained, in accordance with the present invention, the capacitive reactance of the secondary circuit is caused to have a predetermined relationship to the inductive reactance of the secondary circuit as, for example, by incorporating a capacitive reactance $X_c$ therein shown in Figure 3. This typical secondary circuit then comprises inductive reactance $X_L$ and the capacitive reactance $X_c$, the values of each bearing a predetermined relationship to one another. In a typical instance, $X_L$ may take the form of a coupling coil with the terminals 5 and 6 of it being connected across the leads 7 and 8 respectively, the capacitive reactance being connected in the lead 7 in the form of a condenser. The load elements shown in this figure comprises the load itself and may also include such additional instrumentalities as tuning condensers, chokes, and the like. When a circuit as shown in Figure 3 is coupled with the primary circuit of an oscillator the voltage $e$ is induced in it. This voltage is derived from the primary circuit of the oscillator through the mutual coupling of the primary and secondary circuits and may be designated the derived voltage. Letting $V_1$ represent the total voltage across the inductive reactance $X_L$ and the derived voltage $e$ and letting $V_2$ represent the total voltage across the inductive reactance $X_L$, the capacitive reactance $X_c$ and the derived voltage $e$, the vector voltage relationships may be expressed as follows:

$$e = V_1 + jIX_L$$
$$V_1 = e - jIX_L$$
$$V_2 = e - j(IX_L - IX_c)$$

Now if the capacitive reactance be assumed to be twice the inductive reactance, that is, $X_c = 2X_L$ then $$V_2 = e + jIX_L$$

The phase relationships between the voltage $V_1$, $V_2$, $e$ and the current $I$, are shown vectorially in Figures 4, 5, and 6, Figure 4 representing the resonance condition in which the derived voltage $e$ is in phase with the current $I$. In this case, it is seen that the voltage $V_1$ is just equal to the voltage $V_2$. When the derived voltage $e$ lags the current $I$, the voltage $V_1$ is of greater scalar magnitude than $V_2$, as shown in Figure 5, and conversely, when the derived voltage $e$ leads the current, $V_2$ is of greater scalar magnitude than $V_1$.

From these diagrams, it may be seen that when the relationship between the capacitive and inductive reactances is 2 to 1 the voltages $V_1$ and $V_2$ are equal to one another when the circuit is in resonance and, consequently, this circuit is too when $V_1 = V_2$ vectorially. Whenever the circuit is detuned, $V_2$ will be greater or less than $V_1$ as shown in Figures 5 and 6, depending upon the phase angle between $e$ and $I$. In addition to these observations, it is also to be noted that when the secondary circuit is resonant $X_2$ is equal to zero and it is to be seen that $\Delta L$ also equals zero. Under these conditions, no detuning takes place and the transfer of energy from the tank circuit to the output circuit is most efficient. Thus a measurement of the phase angle as represented by the linear subtractive combination of the voltages $V_1$ and $V_2$ provides an indication and also provides the basis for a control of the machine when $\Delta L$ is of some value other than zero or a predetermined value.

Figure 7 illustrates a typical inductively coupled secondary circuit in which this principle is employed to exert a controlling effect upon a switch whenever the circuit becomes detuned through variations in the load. The primary portion of the circuit, of which only the tank coil $L_1$ is disclosed, may be of the usual type, constructed, for example, along the lines of the primary circuit of Figure 1 or in another known manner. The secondary circuit includes a coupling coil 9 having its terminals connected across the leads 10 and 11 respectively.

Each of the leads 10 and 11 contains a condenser 12. The leads 10 and 11 beyond the condensers 12 are taken to the load elements as previously described. The capacitive reactance of the circuit as furnished by the condensers 12, either in whole or in part, is adjusted as previously explained to the inductive reactance as furnished in this case by the coupling coil.

As we have seen when the capacitive reactance is twice the inductive reactance $X_L$ then at resonance the voltage $V_1$ is equal to the voltage $V_2$. For this effect to be obtained therefore each of the condensers 12 may have a value equaling $X_L$ such that the total capacitive reactance $X_c$ is equal to $2X_L$.

*Control circuit*

Choke coils 13 and 14 are respectively connected across the leads 10 and 11 at opposite sides of the condensers 12 so that a voltage $V_1$, equal to the total scalar voltage across the inductive reactance $X_L$ plus the derived voltage $e$, is impressed upon the choke coil 13, while a voltage $V_2$, equal to the total scalar voltage across the inductive reactance $X_L$, capacitive reactances $X_c$ and the derived voltage $e$ is impressed upon the choke coil 14. At high frequencies, the distributed parameters have to be considered and in this explanation $X_L$ is taken as the effective inductive reactance in series with the derived voltage $e$ and $X_c$ is taken as the effective capacitive reactance in series with the derived voltage $e$ and the inductive reactance $X_L$.

At spaced intervals on the coils 13 and 14 respectively, taps are taken to the electrodes 15 of rectifier tubes 16, one for each choke. The cathode elements 17 of the rectifiers 16 are interconnected with one another through a lead 18. A lead 19, containing a resistance 20, extends from a point on the coil 13 intermediate the rectifier electrode tap connections of it, to a similar point on the coil 14, while a lead 21 dividing the resistance 20, is taken to the cathode connection 18.

For control purposes a control relay 22, having a winding 23, is shunted across the terminals of the resistance 20, in parallel with a condenser 24, while a switch 25 is positioned to be actuated through magnetic influence exerted upon it from the core 26 of the control relay.

In this circuit it will be seen that a current proportional to the voltage $V_1$ will flow from the rectifier tube 16 through the leads 18 and 21 and the left-hand portion of the resistance 20 while a current proportional to the voltage $V_2$ will flow from the other rectifier tube 16 through the leads 18 and 21 and the right hand portion of the resistance 20, and a current proportional to the difference between the voltages $V_1$ and $V_2$ will flow through the winding 23 of the relay 22. Thus a current will flow through the relay winding 23 either when $V_1$ is greater than $V_2$ or when $V_2$ is greater than $V_1$, while no current will flow through the relay winding when $V_1$ is equal to $V_2$. Such a condition occurs, in the assumed case in which $X_c$ is equal to $2X_L$ when the circuit is resonent; at such time the effects of $V_1$ and $V_2$ buck each other and are neutralized. Switch 25 normally may be open and when a current flows through the relay winding 23, the core 26 is magnetized to cause closure of the switch.

In the utilization of the invention, as shown in Figure 7, the control switch 25 when operated completes the circuit to a signal device, for example, a buzzer or signal 27 thus becomes energized whenever the voltages $V_1$ and $V_2$ are unequal and the detuning is thus designated to the operator, thereby warning him of the undesirable condition.

In the embodiment disclosed in Figure 8, a control circuit similar to that shown in Figure 7 is employed, and corresponding elements in Figures 7 and 8 bear the same designations. However, in the circuit of Figure 8, two unidirectional rectifiers 28 and 29 are employed, one capable of passing current in one direction when $V_1$ is greater than $V_2$ and the other passing current in the opposite direction when $V_2$ is greater than $V_1$. In this arrangement, a lead 30 is tapped to one end of the resistance 20 and the lead 31 is tapped to the resistance 20 at the other end. Rectifiers 28 and 29 are connected in parallel with one another across the leads 30 and 31, each rectifier, however, being in series with winding 32, 33 respectively of control relays 34 and 35. Control relay 34 controls a switch 36, while control relay 35 controls a switch 37. These switches normally are open and corresponding contacts of the switches 36 and 37 are interconnected through a lead 38. A lead 39 interconnects the other of the contacts of switch 36 with one terminal of a winding 40 of a telemotor 41, while lead 42 connects the other terminal of the telemotor winding 40 with the other contact of switch 37. Another winding 43 of the telemotor is connected at its one end to a midpoint on the telemotor winding 40 and at its other terminal to a source lead 44. The other source lead 45 is taken to connector 38.

The circuit of Figure 8 is provided with the usual tuning condensers 46 which are of the variable type and which are operable in unison through the link 47. These condensers are driven by the telemotor 41 in one direction or the other as indicated generally by the link 48. In the normal operation of the circuit it is tuned by the manipulation of the condensers 46 to resonance. Let us say then that a variation in the load causes voltage $V_1$ to be greater than $V_2$. In this event, a current proportional to the difference between $V_1$ and $V_2$ flows through the lead 30 through rectifier tube 29 and the relay winding 33 back through the lead 31 causing the switch 37 to be closed. The telemotor 40 is thus energized, mechanically actuating the condensers 46 through the link 48 to restore the circuit to the resonant condition. If the nature of the load variation is such that the voltage $V_2$ becomes greater than $V_1$ then a current proportional to the difference between the two flows through the lead 31, through rectifier tube 28 and the relay winding 32 causing closure of switch 36 causing the telemotor to rotate in an opposite direction. In either case, the circuit automatically becomes restored to resonance following disruptance of the resonant condition.

The circuit of Figure 9 is a circuit similar to Figure 7 in its main details, and the corresponding elements are designated by the same numerals, but the circuit of Figure 9 differs in that the switch 25 has its contacts interconnected through the leads 49 and 50 in the lead 11 so that the switch constitutes an element of the secondary circuit. In this case, switch 25 normally is closed and the relay 22 is operated in such manner that when energized, it opens contacts to break the secondary circuit. Thus when the voltage $V_1$ becomes greater than $V_2$ or vice versa, attending the departure from the resonant condition, the switch 25 is opened and the circuit to the load is broken. The plate current subsides and the machine no longer operates under detuned conditions. This condition of inoperation continues until the circuit is readjusted, at which time $V_1$ becomes equal to $V_2$, permitting the switch 25 to close the feed energy to the load. When the machine is shut off, voltage $V_1$ becomes zero and the machine may then be retuned in the usual manner after which the control circuit functions again as just described. It is also to be noted that when the switch is open, the voltage $V_2$ becomes zero but the voltage $V_1$ is a definite positive voltage which causes energization of the relay 22 to keep the switch open until the circuit is readjusted to resonance.

If desirable, the signal unit shown in Figure 7 may be operated in conjunction with control switches, and automatic controls of the type shown in Figures 8, 9, and 10, and from the foregoing principles of the invention and from the typical embodiments shown in the drawings, those skilled in the art readily will understand the variety of modifications to which the present invention is susceptible.

The circuit of Figure 10 embodies a device for controlling the cathode bias of an amplifier tube. This circuit contains a control circuit of the type shown in Figure 7 which is arranged to energize the relay 22. In the primary circuit of the apparatus a resistance 51 is connected in series with the cathode and a switch 52 is arranged to shunt the resistance 51 through the leads 53 and 54. Switch 52 normally is closed and the cathode current flows through the leads 53 and 54 by passing resistance 51. When the switch 52 is opened in response to the energization of the relay 22, the cathode current no longer flows through the leads 53 and 54 but must flow through the resistance 51 which continues to limit it until the machine is readjusted to resonance and the relay 22 de-energized.

While the circuits in the drawing are shown in relation to master controlled amplifiers, the invention also is applicable to self-excited oscillators for exerting controlling effects or signals when variations in the load cause detuning which is manifest as a deviation from the desired frequency. In this respect, the invention functions to stabilize the frequency of the circuit. At resonance, $X_2$ the total reactance is zero, but it is also true when $X_c$ is equal to $2X_L$ then $V_1$ equals $V_2$. Therefore, it is to be observed that the equality of $V_1$ and $V_2$ at resonance is a measure of the total reactance in secondary circuit.

Since $$\Delta L = -\frac{WM^2X_2}{R_2^2 + X_2^2}$$

then, if $X_2=0$, $\Delta L$ is zero at resonance.

In a self-excited oscillator $\Delta L$ is the primary factor causing frequency deviations when the load impedance varies. Thus by controlling the circuit so that adjustments are made whenever $V_1$ and $V_2$ become unequal, the frequency deviation of a self-excited oscillator is limited by the present improvement and is kept at a minimum. At present, the usual self-excited oscillator without stabilizing equipment of this sort is subject to wide deviations in the frequency as caused by variations in the load.

It is also to be observed that while the present invention has been disclosed in relation to circuits in which the secondary is coupled inductively to the primary, the invention also is equally useful when the coupling is of the direct or the capacitive type. The term "coupling," therefore, as employed in the specification and the claims, designates each of these modes of coupling.

In the embodiments of the invention shown in the drawings and in the foregoing description, it has been assumed that the capacitive reactance is equal to twice the inductive reactance. Under these conditions, the voltages $V_1$ and $V_2$ equal one another at resonance, however, it is also to be understood that the invention contemplates a predetermined relationship between the capacitive and inductive reactances other than the assumed two-to-one relationship. In such a case, $V_1$ will not be equal to $V_1$ at resonance but some other phase condition and control devices similar to those disclosed may be employed for controlling the apparatus to maintain it at a given phase condition other than resonance.

Having described my invention, I claim:

1. In a high frequency circuit of the type described, a primary circuit having an electron tube, a secondary circuit coupled with the primary circuit so as to derive voltage therefrom, the secondary circuit having a given inductive reactance, and also having a capacitive reactance connected in series with the inductive reactance and said derived voltage, the said capacitive reactance being equal to twice the inductive reactance, neglecting distributed parameters, whereby, at resonance, the scalar voltage across the inductive reactance and derived voltage is equal to the scalar voltage across the inductive and capacitive reactances and derived voltage substantially regardless of the load upon the apparatus, and means responsive to the difference between said scalar voltages for exerting a controlling effect whenever the scalar voltages are not equal to one another.

2. In a high frequency circuit of the type described, a primary circuit having an electron tube, a secondary circuit coupled with the primary circuit so as to derive voltage therefrom, the secondary circuit having a given inductive reactance, and also having a capacitive reactance connected in series with the inductive reactance and said derived voltage, the said capacitive reactance being equal to twice the inductive reactance, whereby, at resonance, the scalar voltage across the inductive reactance and derived voltage is equal to the scalar voltage across the inductive and capacitive reactances and derived voltage substantially regardless of the load upon the apparatus, means for tuning the secondary circuit with the primary circuit, a telemotor device for adjusting said tuning means, and means responsive to the difference between said scalar voltages for exerting a selective controlling effect upon said telemotor device whenever the scalar voltages are not equal to one another, whereby the condition of equality between the scalar voltages in the circuit is restored.

3. In a high frequency circuit of the type described, a primary circuit having an electron tube, a secondary circuit coupled with the primary circuit so as to derive voltage therefrom, the secondary circuit having given inductive reactance, and also having a capacitive reactance connected in series with the inductive reactance and said derived voltage, the said capacitive reactance having a predetermined value relative to said inductive reactance such that the scalar voltage across the inductive reactance and derived voltage will bear a predetermined relation to the scalar voltage across the inductive and capacitive reactances and derived voltage when a predetermined phase condition exists in the secondary circuit, a control circuit upon which said scalar voltages are impressed, in common, in such manner that their electrical effects tend to buck one another whereby the control circuit responds to the difference between said scalar voltages, and a control device controlled by said control circuit for exerting a controlling effect when the scalar voltages are not in said predetermined relationship.

4. In a high frequency circuit of the type described, a primary circuit having an electron tube, a secondary circuit coupled with the primary circuit so as to derive voltage therefrom, the secondary circuit having given inductive reactance, and also having a capacitive reactance connected in series with the inductive reactance and said derived voltage, the said capacitive reactance having a predetermined value relative to said inductive reactance such that the scalar voltage across the inductive reactance and derived voltage will bear a predetermined relation to the scalar voltage across the inductive and capacitive reactances and derived voltage when a predetermined phase condition exists in the secondary circuit, a control circuit, the said scalar voltages being impressed thereon, in common, in such manner that their electrical effects tend to buck one another therein whereby a predetermined current condition exists in said control circuit when said scalar voltages are in said predetermined relationship, and a control device responsive to said control circuit when the current condition therein is other than said predetermined current condition.

5. In a high frequency circuit of the type described, a primary circuit having an electron tube, a secondary circuit coupled with the primary circuit so as to derive voltage therefrom, the secondary circuit having a given inductive reactance, and also having capacitive reactance connected in series with the inductive reactance and said derived voltage, with the capacitive reactance equal to twice the inductive reactance, neglecting distributed parameters, whereby, at resonance, the scalar voltage across the inductive reactance and derived voltage is equal to the scalar voltage across the inductive and capacitive reactances and derived voltage substantially regardless of the load upon the apparatus, a control circuit upon which said scalar voltages are impressed, in common, in such manner that their electrical effects tend to buck one another therein, whereby the control circuit responds to the difference between said scalar voltages, and a control device comprising a signal unit which when actuated denotes inequality between said scalar voltages, and thus denotes a detuned condition in the apparatus, the said control device being actuated through said control circuit.

6. In a high frequency circuit of the type described, a primary circuit including an electron tube having plate, grid and cathode elements with a resistance connected to the cathode and a circuit which is normally closed for shunting said resistance, a secondary circuit coupled with the primary circuit so as to derive a voltage therefrom, the said secondary circuit having inductive reactance in series with said derived voltage and also having capacitive reactance in series with the inductive reactance and said derived voltage, the said capacitive reactance bearing a predetermined relationship to the inductive reactance such that the scalar voltage across the derived voltage and inductive reactance bears a predetermined relationship to the scalar voltage across the derived inductive reactance and capacitive reactance at a predetermined phase condition, a switch for opening said shunt across said cathode resistance and control means responsive to the difference between said scalar voltages for opening said switch when said scalar voltages are in the said predetermined relationship.

CARL K. GIERINGER.

REFERENCES CITED

The following references are of record in the file of this patent:

UNITED STATES PATENTS

| Number | Name | Date |
|---|---|---|
| 2,190,319 | Koch | Feb. 13, 1940 |
| 2,100,394 | Heising | Nov. 30, 1937 |
| 2,231,997 | Guanella | Feb. 18, 1941 |